(12) United States Patent
Huang et al.

(10) Patent No.: US 6,904,084 B2
(45) Date of Patent: Jun. 7, 2005

(54) READ CHANNEL APPARATUS AND METHOD FOR AN OPTICAL STORAGE SYSTEM

(75) Inventors: Ke-Chiang Huang, Taipei Hsien (TW); Tzu-Pai Wang, Taipei Hsien (TW)

(73) Assignee: Mediatek Incorporation, Hsinchu (TW)

( * ) Notice: Subject to any disclaimer, the term of this patent is extended or adjusted under 35 U.S.C. 154(b) by 829 days.

(21) Appl. No.: 09/947,169

(22) Filed: Sep. 5, 2001

(65) Prior Publication Data

US 2003/0043898 A1 Mar. 6, 2003

(51) Int. Cl.$^7$ ............................................... H03H 7/40

(52) U.S. Cl. ..................... 375/229; 375/340; 375/350; 375/355; 369/47.18; 369/47.29; 369/47.35; 369/59.22; 360/65

(58) Field of Search ............................... 375/229, 262, 375/324, 340, 341, 350; 708/323; 369/47.15, 47.18, 47.28, 47.29, 47.35, 59.21, 59.22; 360/65

(56) References Cited

U.S. PATENT DOCUMENTS

| | | | | |
|---|---|---|---|---|
| 5,400,364 | A | * | 3/1995 | Yada ........................... 375/327 |
| 5,802,118 | A | | 9/1998 | Bliss et al. |
| 6,418,101 | B1 | * | 7/2002 | Finkelstein .............. 369/47.18 |
| 6,674,707 | B2 | * | 1/2004 | Ogura et al. ............. 369/59.22 |

OTHER PUBLICATIONS

Gardner, Floyd, *IEEE Transactions On Communications,* vol. 41, No. 3, Mar. 1993, 501–507.
Erup, Lars, *IEEE Transactions On Communications,* vol. 41, No. 6, Jun. 1993, 998–1008.

\* cited by examiner

Primary Examiner—Dac V. Ha
(74) Attorney, Agent, or Firm—Thomas, Kayden, Horstemeyer & Risley

(57) ABSTRACT

A read channel apparatus is disclosed for reading data recorded on an optical storage system at a predetermined baud rate. The apparatus asynchronously samples an analog read signal generating from the optical storage system and subtracts an estimated DC offset from the asynchronous sample values to generate a sequence of asynchronous DC-removed sample values. The asynchronous DC-removed sample values are separately interpolated by two interpolators to generate a sequence of synchronous even-time sample values and a sequence of synchronous odd-time sample values respectively. The synchronous even-time and odd-time sample values are separately equalized by two equalizers in accordance with a target spectrum to generate a sequence of even-time equalized sample values and a sequence of odd-time equalized sample values respectively. A DC offset estimator generates the estimated DC offset from the even-time equalized sample values and the odd-time equalized sample values. The interpolators are under the control of a timing recovery controller for synchronizing the even-time and odd-time sample values to the baud rate. In the preferred embodiment, the recorded data are determined from the even-time equalized sample values and the odd-time equalized sample values.

10 Claims, 2 Drawing Sheets

200

READ CHANNEL APPARATUS AND METHOD FOR AN OPTICAL STORAGE SYSTEM

FIELD OF THE INVENTION

The present invention relates generally to an optical storage system and, in particular, to a read channel apparatus and method for an optical storage system.

BACKGROUND OF THE INVENTION

In recent years, the development of new optical recording media and data compression techniques has made it possible to achieve enormous data storage capacity using optical storage systems. Optical storage systems are used to store audio information, such as in Compact Disk (CD) players, as well as visual and computer information, such as in CD-ROM and the more recent Digital Video Disk (DVD) players. The information is typically recorded as a binary sequence by writing a series of "pits" on the optical medium which represent binary "1" and "0" bits. When reading this recorded data, a pick-up head (transducer), positioned in close proximity to the rotating disk, detects the alternations on the medium and generates an analog read signal. The analog read signal is then detected and decoded by read channel circuitry to reproduce the recorded data.

To improve performance of the read channel in an optical storage system, the sampled amplitude techniques are applied. Sampled amplitude read channels commonly employ an analog-to-digital converter (ADC) and a digital read channel processor to reproduce data recorded on the optical storage systems. However, in high-speed optical storage systems, the baud rate (channel bit rate) is very high such that sampling frequency of ADC and clock of digital processor also need comparable high clock rate sources. This is not desirable since operating the channel at higher frequencies increases its complexity and cost. There is, therefore, a need for a sampled amplitude read channel for use in storage systems that can operate at high data rates and densities without increasing the cost and complexity of the read channel ICs. To this end, U.S. Pat. No. 5,802,118 (Bliss et al.) discloses a sub-sampled discrete time read channel for magnetic disk storage systems. According to this patent, the read channel sub-samples an analog signal at a rate less than or equal to $9/10$ the baud rate. K. C. Huang, the inventor of present invention, discloses a sub-sampled method for read channel of an optical storage system in Taiwan patent application No. 089,110,848, filed in June 2000. The prior art sub-samples an analog signal at a rate slightly above ½ the baud rate. The sub-sampled values are down-sampled by a timing recovery interpolator to generate sample values synchronized to one-half the baud rate. The synchronous sample values are then equalized by a 2T-spaced equalizer and interpolated by a factor-two upsampler. Although it significantly reduces the sampling frequency, the latency time introduced by the upsampler causes significant degradation in the performance of the high-speed optical storage systems.

For the reasons mentioned above, a novel read channel apparatus and method is provided to reproduce data recorded on the optical storage systems, unencumbered by the limitations associated with the prior art.

SUMMARY OF THE INVENTION

It is one object of the present invention to provide a read channel apparatus and method for an optical storage system which sub-samples an analog read signal at a rate slightly above one-half the baud rate to reduce clock rate of the read channel.

It is another object of the present invention to provide a read channel apparatus and method for an optical storage system that reproduces recorded data with better performance by getting rid of the latency of up-sampling.

To achieve the above object of the present invention, there is provided a read channel apparatus and method for reading data recorded on an optical storage system at a predetermined baud rate. The read channel apparatus includes a sampling device, a subtractor, two interpolators, two equalizers, and a DC offset estimator. The sampling device asynchronously samples an analog read signal generating from the optical storage system to generate a sequence of asynchronous sample values. The subtractor subtracts an estimated DC offset from the asynchronous sample values to generate a sequence of asynchronous DC-removed sample values. Then, the first interpolator interpolates the asynchronous DC-removed sample values to generate a sequence of synchronous even-time sample values substantially synchronized to one-half the baud rate. The second interpolator also interpolates the asynchronous DC-removed sample values to generate a sequence of synchronous odd-time sample values substantially synchronized to one-half the baud rate. Thereafter, the first equalizer equalizes the synchronous even-time sample values in accordance with a target spectrum to generate a sequence of even-time equalized sample values. The second equalizer equalizes the synchronous odd-time sample values in accordance with the target spectrum to generate a sequence of odd-time equalized sample values. Besides, a DC offset estimator generates the estimated DC offset from the even-time equalized sample values and the odd-time equalized sample values. The two interpolators are under the control of a timing recovery controller for synchronizing the even-time and odd-time sample values to the baud rate. In a preferred embodiment, a sequence detector detects the recorded data from the even-time equalized sample values and the odd-time equalized sample values.

BRIEF DESCRIPTION OF THE DRAWINGS

The above and other aspects and advantages of the present invention will be better understood by reading the following detailed description of the invention in conjunction with the drawings, wherein.

DETAILED DESCRIPTION OF THE PREFERRED EMBODIMENT

Figure 1:
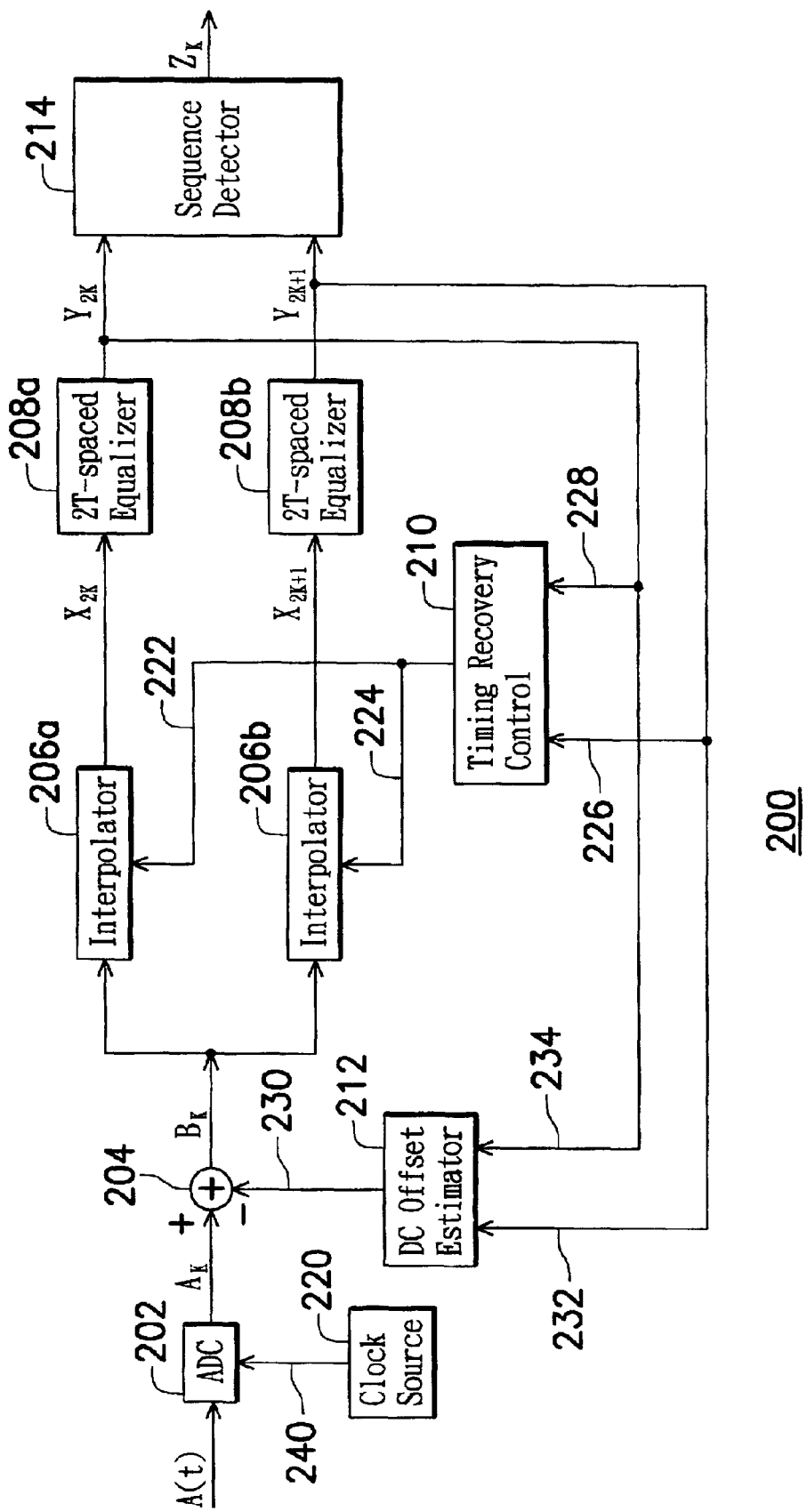
FIG. 1 is a block diagram illustrating a read channel in accordance with the present invention.
Figure 2A:
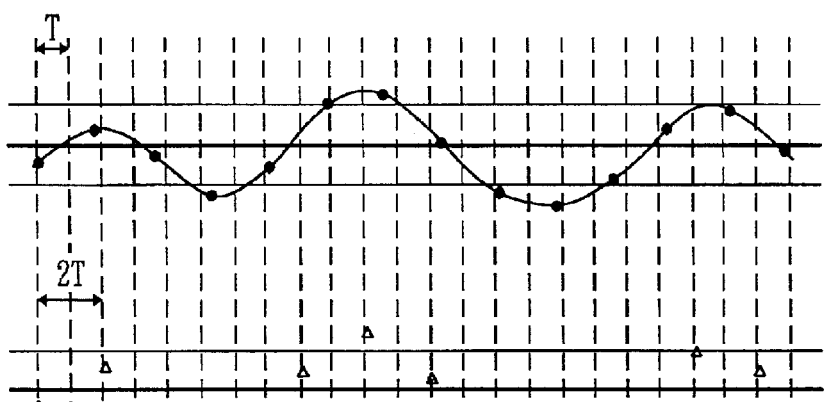
FIG. 2A shows the asynchronous sample values $A_K$ sampled from an analog read signal A(t)

With reference to FIGS. 1 and 2A~2G, the present invention will become more apparent from the following detailed description. A read channel apparatus 200 for reading data recorded on an optical storage system at a predetermined baud rate is shown in FIG. 1. The analog read signal A(t), generating from the optical storage system, is asynchronously sampled by a sampling device 202 (e.g., an analog-to-digital converter) to generate a sequence of asynchronous sample values $A_K$. The sampling device 202 is clocked at a constant frequency fs by a sampling clock 240 generated by a clock source 220. The sequence of asynchronous sample values $A_K$ is related to the analog read signal A(t) as $$A_K=\{\ldots, A(0), A(\tau), A(2\tau), \ldots, A(k\tau), \ldots\}$$

where k is an integer and $\tau=1/fs$. In FIG. 2A, the analog read signal is shown as a solid line, and the asynchronous sample values $A_K$ are shown as black dots. It should be noted that T, as depicted in FIGS. 2A~2G, denotes the baud rate interval and 1/T denotes the baud rate. Since the frequency spectrum of the analog read channel A(t) received from the read transducer is bandlimited to about ¼T. Thus, the sampling device 202 only needs to sample the analog read signal A(t) at a rate slight above ½ the baud rate, i.e., fs>½T, rather than synchronous sampling at the baud rate. In FIG. 2A, for instance, the analog read signal A(t) is sampled at 4/7 the baud rate.

With continued reference to FIG. 1, a subtractor 204 subtracts an estimated DC offset, over line 230, from the asynchronous sample values $A_K$ to generate a sequence of asynchronous DC-removed sample values $B_K$. This can be denoted as $$B_K=\{\ldots, B(0), B(\tau), B(2\tau), \ldots, B(k\tau), \ldots\}$$

and $$B(k\tau)=A(k\tau)-DC$$

where DC denotes the estimated DC offset.

Figure 2B:
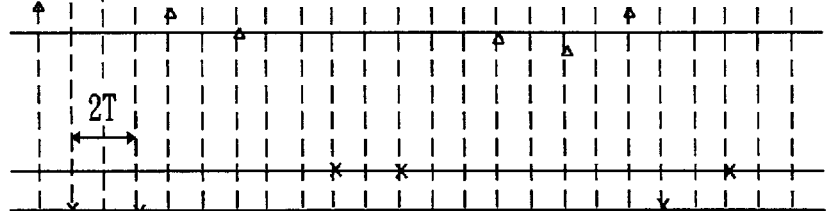
FIG. 2B shows the synchronous even-time sample values $X_{2K}$ substantially synchronized to ½ the baud rate.
Figure 2C:
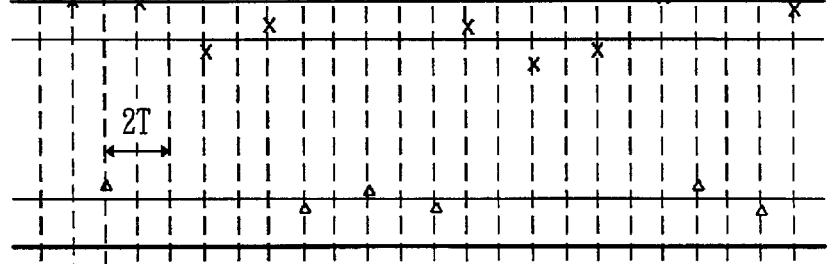
FIG. 2C shows the synchronous odd-time sample values $X_{2K+1}$ substantially synchronized to ½ the baud rate.

According to the present invention, the first interpolator 206a interpolates the asynchronous DC-removed sample values $B_K$ and generates a sequence of synchronous even-time sample values $X_{2K}$ substantially synchronized to one-half the baud rate. The second interpolator 206b also interpolates the asynchronous DC-removed sample values $B_K$ to generate a sequence of synchronous odd-time sample values $X_{2K+1}$ substantially synchronized to one-half the baud rate. As depicted in FIGS. 2B and 2C, the synchronous even-time sample value $X_{2K}$ is shown as "Δ" and the synchronous odd-time sample value $X_{2K+1}$ is shown as "x". The synchronous even-time and odd-time sequences can be denoted as $$X_{2K}=\{\ldots, X(0), X(2T), X(4T), \ldots, X(2kT), \ldots\}$$

and $$X_{2K+1}=\{\ldots, X(1), X(3T), X(5T), \ldots, X((2k+1)T), \ldots\}$$

where k is an integer and T is the baud rate interval. Hence, the synchronous even-time sequence $X_{2K}$ has a spacing between samples equal to 2T and the synchronous odd-time sequence $X_{2K+1}$ also has a spacing between samples equal to 2T. For more details concerning the interpolators 206a and 206b, refer to F. M. Gardner, "Interpolation in Digital Modems—Part I: Fundamentals", *IEEE Trans. Commun.*, Vol. 41, pp.502–508, March 1993; and L. Erup, F. M. Gardner, and R. A. Herris, "Interpolation in Digital Modems—Part II: Implementation and performance", *IEEE Trans. Commun.*, Vol. 41, pp.998–1008, June 1993.

Figure 2D:
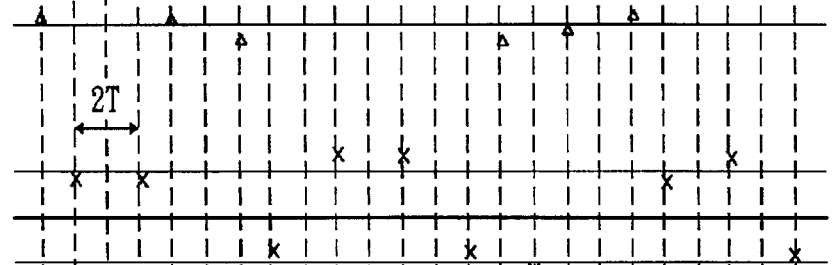
FIG. 2D shows the even-time equalized sample values $Y_{2K}$.
Figure 2E:
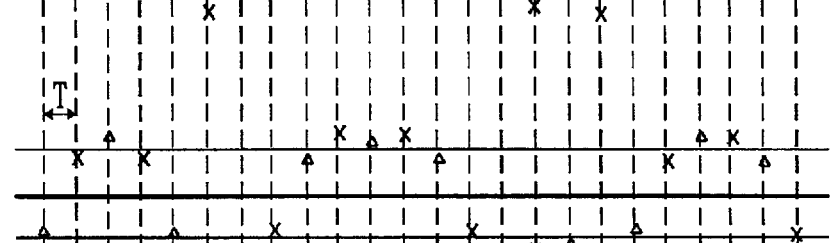
FIG. 2E shows the odd-time equalized sample values $Y_{2K+1}$.

The synchronous even-time and odd-time sequences are separately equalized according to a target spectrum. That is, the high-frequency components of $X_{2K}$ and $X_{2K+1}$ are enhanced by equalization. This can be implemented with, for instance, two 5-tap symmetric 2-T spaced equalizers. A first 2T-spaced equalizer 208a equalizes the synchronous even-time sample values $X_{2K}$ in accordance with the target spectrum to generate a sequence of even-time equalized sample values $Y_{2K}$. The second 2T-spaced equalizer 208b equalizes the synchronous odd-time sample values $X_{2K+1}$ in accordance with the target spectrum to generate a sequence of odd-time equalized sample values $Y_{2K+1}$. The first and second 2T-spaced equalizers preferably employ the same coefficients. Referring to FIGS. 2D and 2E, the even-time and odd-time equalized sequences can be represented by $$Y_{2K}=\{\ldots, Y(0), Y(2T), Y(4T), \ldots, Y(2kT), \ldots\}$$

and $$Y_{2K+1}=\{\ldots, Y(1), Y(3T), Y(5T), \ldots, Y((2k+1)T), \ldots\}$$

The even-time and odd-time equalized sequences are fed back to a timing recovery controller 210 and a DC offset estimator 212. The timing recovery controller 210 respectively controls the first interpolator 206a and the second interpolator 206b, in response to $Y_{2K}$ and $Y_{2K+1}$ received over line 226 and line 228, to synchronize the even-time and odd-time sample values to the baud rate. The DC offset estimator 212, in response to $Y_{2K}$ and $Y_{2K+1}$ received over line 232 and line 234, generates the estimated DC offset.

Figure 2F:
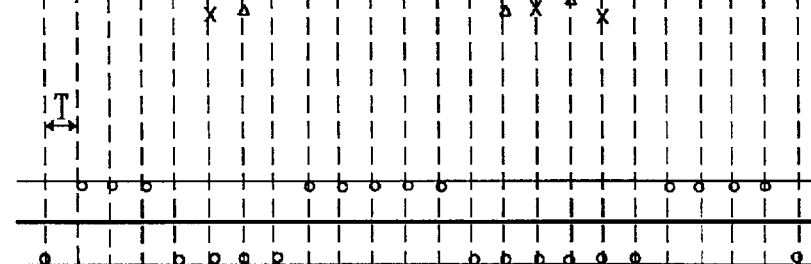
FIG. 2F shows a sequence $Y_K$ composed of $Y_{2K}$ and $Y_{2K+1}$ wherein all sample values are substantially synchronized to the baud rate.
Figure 2G:
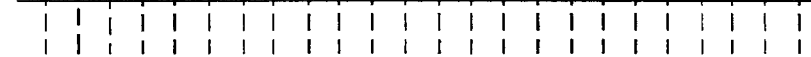
FIG. 2G shows a binary sequence $Z_K$ determined by a sequence detector.

Referring to FIGS. 2F and 2G, if the quality (e.g., signal-to-noise ratio) of the analog read signal is good enough, an estimated binary sequence $Z_K$ representing recorded data can be determined directly from $Y_K$. The sequence $Y_K$ is composed of $Y_{2K}$ and $Y_{2K+1}$ as illustrated in FIG. 2F. For example, the m-th bit of $Z_K$ is estimated to be "1" if Y(mT)>0, and "0" if y(mT)<0. However, if the quality of the analog read signal is poor, a sequence detector 214 is preferably applied to detect the sequence $Z_K$ from $Y_{2K}$ and $Y_{2K+1}$. The sequence detector 214 typically utilizes the Viterbi algorithm to implement the run length limitation of DVD systems. In DVD, the minimum run length is 3, that is, the sequence with "...0001000...", "...00011000...", "...1110111...", and "...11100111..." are not allowed in DVD and will be filtered out by the sequence detector 214. Thus, the read channel apparatus 200 as described above, processes the even-time and odd-time sample values separately so that it avoids degrading in performance caused by an up-sampling latency.

The objects of the invention have been fully realized through the preferred embodiment disclosed herein. It will be apparent that the invention is not limited thereto, and that many modifications and additions may be made within the scope of the invention. Therefore, it is the object of the appended claims to cover all such variations and modifications as come within the true spirit and scope of the invention.

What is claimed is:

1. A read channel apparatus for reading data recorded on an optical storage system at a predetermined baud rate, comprising:

a sampling device for asynchronously sampling an analog read signal generating from the optical storage system to generate a sequence of asynchronous sample values;

a subtractor for subtracting an estimated DC offset from the asynchronous sample values to generate a sequence of asynchronous DC-removed sample values;

a first interpolator for interpolating the asynchronous DC-removed sample values to generate a sequence of synchronous even-time sample values substantially synchronized to one-half the baud rate;

a second interpolator for interpolating the asynchronous DC-removed sample values to generate a sequence of synchronous odd-time sample values substantially synchronized to one-half the baud rate;

a first equalizer for equalizing the synchronous even-time sample values in accordance with a target spectrum to generate a sequence of even-time equalized sample values;

a second equalizer for equalizing the synchronous odd-time sample values in accordance with the target spectrum to generate a sequence of odd-time equalized sample values;

a timing recovery controller, responsive to the even-time equalized sample values and the odd-time equalized sample values, for controlling the first interpolator and the second interpolator respectively in order to synchronize the even-time and odd-time sample values to the baud rate; and a DC offset estimator for generating the estimated DC offset from the even-time equalized sample values and the odd-time equalized sample values;

wherein the recorded data are determined from the even-time equalized sample values and the odd-time equalized sample values.

2. The read channel apparatus of claim 1, further comprising a sequence detector for detecting the recorded data from the even-time equalized sample values and the odd-time equalized sample values.

3. The read channel apparatus of claim 2, wherein the sequence detector is a Viterbi sequence detector.

4. The read channel apparatus of claim 1, wherein the sampling device samples the analog read signal at a sampling rate slightly above ½ the baud rate of the data recorded on the optical storage system.

5. The read channel apparatus of claim 4, wherein the sampling device is an analog-to-digital converter.

6. The read channel apparatus of claim 1, wherein coefficients of the first equalizer and coefficients of the second equalizer are the same.

7. The read channel apparatus of claim 6, wherein the first and second equalizers a re 2T-spaced equalizers where T stands for a baud rate interval of the data recorded on the optical storage system.

8. A read channel method for reading data recorded on an optical storage system at a predetermined baud rate, comprising:

asynchronously sampling an analog read signal from the optical storage system to generate a sequence of asynchronous sample values;

subtracting an estimated DC offset from the asynchronous sample values to generate a sequence of asynchronous DC-removed sample values;

separately interpolating the asynchronous DC-removed sample values to respectively generate a sequence of synchronous even-time sample values substantially synchronized to one-half the baud rate and a sequence of synchronous odd-time sample values substantially synchronized to one-half the baud rate;

separately equalizing the synchronous even-time and odd-time sample values in accordance with a target spectrum to respectively generate a sequence of even-time equalized sample values and a sequence of odd-time equalized sample values;

generating the estimated DC offset from the even-time equalized sample values and the odd-time equalized sample values; and detecting the recorded data from the even-time equalized sample values and the odd-time equalized sample values.

9. The read channel method of claim 8, wherein the detecting step performs a run length limitation with Viterbi detection to determine the recorded data from the even-time equalized sample values and the odd-time equalized sample values.

10. The read channel method of claim 8, wherein the sampling step samples the analog read signal at a sampling rate slight above ½ the baud rate of the data recorded on the optical storage system.

* * * * *